A. A. BENNETT.
Cartridge-Box.
No. 1,451 Reissued Apr. 14, 1863.
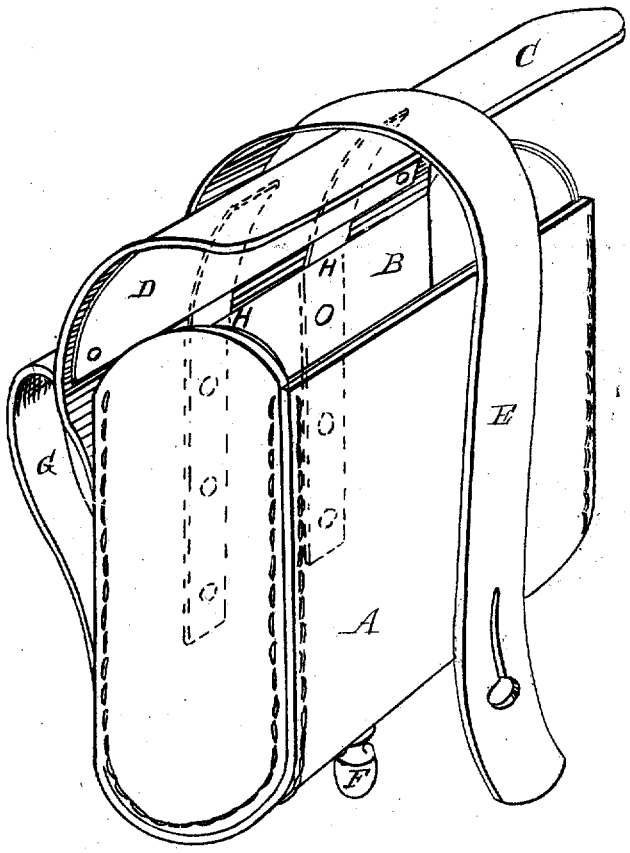
Witnesses:
J. H. Gaulerschmidt
Charles Smith
Inventor:
A. A. Bennett
W. Knight Bros Attys
N. PETERS, PHOTO-LITHOGRAPHER, WASHINGTON, D. C.

UNITED STATES PATENT OFFICE.

AUGUSTUS A. BENNETT, OF CINCINNATI, OHIO.

IMPROVEMENT IN CARTRIDGE-BOXES.

Specification forming part of Letters Patent No. 37,485, dated January 27, 1863; Reissue No. 1,451, dated April 14, 1863.

DIVISION B.

*To all whom it may concern:*

Be it known that I, AUGUSTUS A. BENNETT, of Cincinnati, Hamilton county, Ohio, have invented a new and useful Cartridge-Box; and I do hereby declare that the following is a full, clear, and exact description thereof, reference being had to the annexed drawings, making part of this specification.

My invention relates to a new manufacture of self-closing cartridge-box, as hereinafter set forth.

A is the outer casing of a cartridge-box, which casing may be of leather, enameled cloth, or other suitable material. B is a sheet-metal lining of the same. C is a leather cover attached by one edge to the rear of the box, crimped to a semi cylindrical form and lined with a semi-cylindrical strip of sheet-metal D.

The strap E, stud F, and suspending loop or loops G may be of any desired form.

H H′ are two steel-plate springs, the lower portions of which are straight and are securely riveted between the rear portion of the leather box and its metallic lining, while the upper portions of the said springs are curved forward to correspond with the arch of the cover, and simply play between the leather and metallic portions of the cover without being attached to either. They thus act to insure the closing of the cover whenever the box is not in use, while they are at the same time adapted to yield readily to an opening pressure applied to the cover.

The above-described form has been selected for illustration as being one which practical test has proved to be effective; but I do not desire to confine myself to the precise construction indicated, so long as I attain the same results by means substantially equivalent—for example, a modification of the above may consist of a metallic or other box, whose lid is hinged to its rear edge and is held in a closed or open position, at will, by a pair of volute or other springs suitably incased within the box, and such a provision for self-closure may supersede all extraneous fastening requiring special manipulation, such as the strap E or otherwise.

I claim as a new and useful article of manufacture—

The cartridge-box A B, whose cover is made self-closing by means of one or more metallic springs, constructed, adapted, and operating substantially as described.

In testimony of which invention I hereunto set my hand.

AUGUSTUS A. BENNETT

Witnesses:

GEO. H. KNIGHT,

JAMES R. CHALLEN.